T. WOLFE.
Sulky Plow.

No. 52,104.

Patented Jan. 16, 1866.

Witnesses:
Wm E Lyons
J. W. B. Covington

Inventor:
Thomas Wolfe
Munn & Co.
Attys

UNITED STATES PATENT OFFICE.

THOMAS WOLFE, OF GIRARD, ILLINOIS.

IMPROVEMENT IN SULKY-PLOWS.

Specification forming part of Letters Patent No. 52,104, dated January 16, 1866.

*To all whom it may concern:*

Be it known that I, THOMAS WOLFE, of Girard, in the county of Macoupin and State of Illinois, have invented a new and Improved Sulky-Plow; and I do hereby declare that the following is a full, clear, and exact description thereof, which will enable others skilled in the art to make and use the same, reference being had to the accompanying drawings, forming part of this specification, in which—

Figure 1:
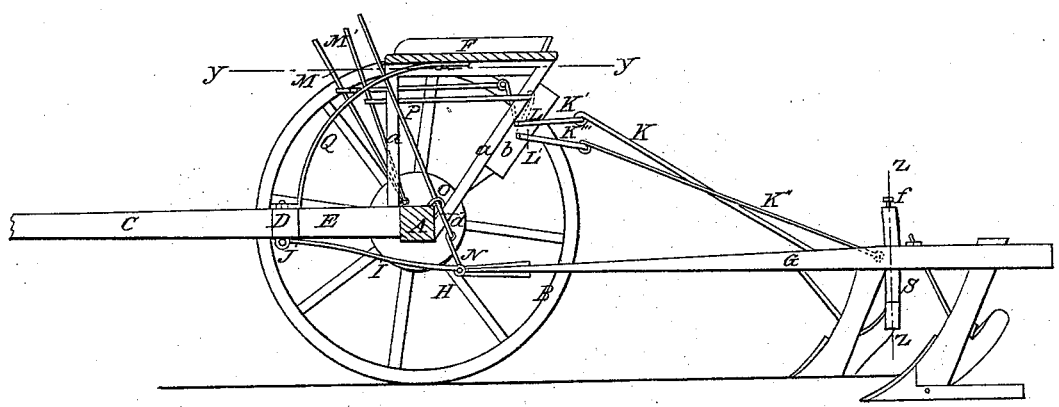
Figure 2:
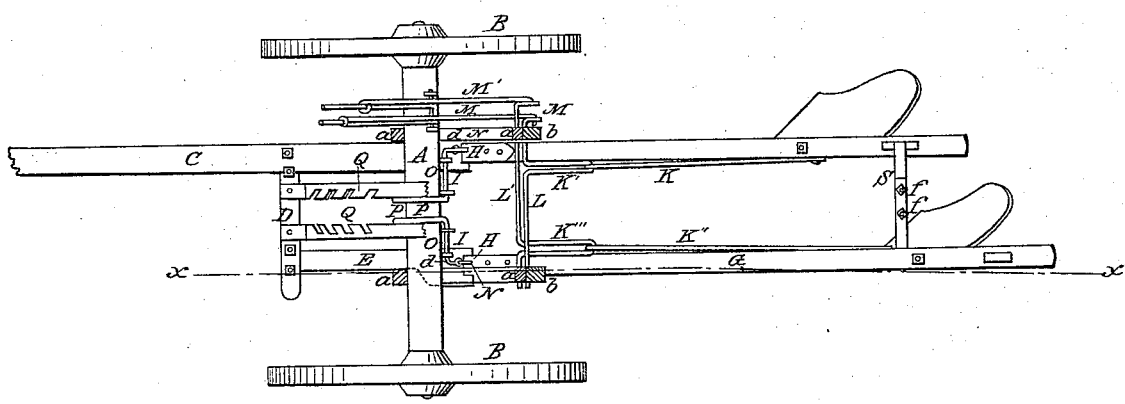
Figure 3:
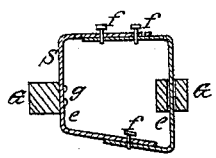

Figure 1 is a side sectional view of my invention, taken in the line $x\,x$, Fig. 2; Fig. 2, a plan or top view of the same with the seat removed, as indicated by the line $y\,y$, Fig. 1; Fig. 3, a vertical section of a portion of the same, taken in the line $z\,z$, Fig. 1.

Similar letters of reference indicate like parts.

This invention relates to a new and improved plow of that class which are connected to a mounted frame supporting a driver's seat, and one commonly termed "sulky-plows."

The invention consists in a novel manner of attaching the plow-beams—two in number—to the framing of the device, and arranging and operating the same, as hereinafter set forth, whereby either plow-beam may be operated (raised and lowered) separately or independently of the other, one or both plows made to work as may be desired, and the plows adjusted so as to penetrate the earth at a greater or less depth, to suit circumstances.

A represents the axle of the device, having a wheel, B, at each end of it, and C is the draft-pole, the rear end of which is framed into the axle at one side of its center, and has a bar, D, projecting from it at right angles, the outer part of which has a bar, E, framed into it, extending from the axle A, as shown clearly in Fig. 2.

F represents the driver's seat, which is secured to supports $a$ attached to the axle A, and G G are two plow-beams, the front ends of which are connected by hinges H to metal springs I I, the latter being secured or fitted at their outer or front ends on a rod, J, the bearings of which are one at the under side of the draft-pole and the other at the under side of bar D. Each plow-beam G is connected by a rod, K, with cranks, one crank, K', being on a shaft, L, which has its bearings $b$ attached to the rear supports, $a$, of the driver's seat F, the other rod, K'', being attached to a crank, K''', on a shaft, L', which is fitted in the same bearings. These shafts L L' have levers M M' attached to their outer ends, said levers being within convenient reach of the driver on his seat F, and it will be seen that by shoving forward these levers the plow-beams and plows may be raised up out from the earth and rendered inoperative whenever required, and both plows may be thus adjusted, or only one of them, as occasion may require.

The hinges H, which connect the front ends of the plow-beams G to the springs I, have each a rod, N, attached, and these rods are connected to arms $d$, which project from shafts O, the bearings of which are on the axle A, said shafts having levers P attached, which extend forward of the driver's seat F, and are retained at any desired height by notched bars Q. By actuating these levers P the springs I may be adjusted higher or lower, and the points of the plows P inclined more or less upward or downward, according to the depth of furrow required.

The rear parts of the plow-beams G G are guided by a quadrilateral frame, S, (see Fig. 3,) composed of two parts, $e\,e$, the ends of which overlap each other, and are connected by bolts $f$, a series of holes being made in the lapped ends of the bars to admit of the frame S being expanded or contracted, as desired. One part $e$ of this frame is bolted to one of the plow-beams G, as shown at $g$, and the other part $e$ passes loosely through a mortise in the other plow-beam. By these means the frame is made to serve as a guide for the two plow-beams, to steady them in their rising and falling, and it may be expanded or contracted, so that the plow-beams may be adjusted at a greater or less distance apart, as desired, the springs I being also capable of being adjusted at a greater or less distance apart. The whole arrangement is extremely simple and efficient, and the plows are placed under the complete control of the driver.

Having thus described my invention, I claim as new and desire to secure by Letters Patent—

1. The connecting of the front ends of the plow-beams G G by hinges H to springs I, attached to the framing of the device, in combination with the shaft O, arms $d$, rods N, and levers P, or an equivalent means for operating the springs, substantially as and for the purpose herein set forth.

2. The raising and lowering of the plow-beams through the medium of the rods K K″, cranks K′ K‴, shafts L L′, and levers M M′, all arranged substantially as described.

3. The adjustable frame S, constructed and applied to the plow-beams G G, substantially as and for the purpose specified.

The above specification of my invention signed by me this 2d day of October, 1865.

THOMAS WOLFE.

Witnesses:
    M. C. BRELSFORD,
    U. A. JONES.